United States Patent [19] … [11] 4,010,240
von Plessen et al. … [45] Mar. 1, 1977

[54] PROCESS FOR THE REGENERATION OF SULFURIC ACID

[75] Inventors: Helmold von Plessen, Kelkheim, Taunus; Eberhard Fischer, Hofheim, Taunus; Siegfried Schiessler, Frankfurt am Main, all of Germany

[73] Assignee: Hoechst Aktiengesellschaft, Frankfurt am Main, Germany

[22] Filed: June 12, 1974

[21] Appl. No.: 478,631

[30] Foreign Application Priority Data

June 14, 1973 Germany ............... 2330281

[52] U.S. Cl. .................... 423/269; 134/12; 203/7; 203/28; 252/387; 423/523; 423/525; 423/531

[51] Int. Cl.² .............. C01B 17/90; C23F 11/04

[58] Field of Search .......... 423/523, 525, 526, 529, 423/531, 269; 203/12, 28, 81, 7; 210/73; 134/12, 13; 21/27 R; 252/387

[56] References Cited

UNITED STATES PATENTS

| | | | |
|---|---|---|---|
| 1,545,498 | 7/1925 | Klinger et al. | 252/387 |
| 1,795,995 | 3/1931 | Busching | 423/531 |
| 2,049,517 | 8/1936 | Saukaitis | 423/269 |
| 2,134,909 | 11/1938 | de Nooji et al. | 423/531 |
| 2,313,910 | 3/1943 | Archibald | 423/525 |
| 2,513,131 | 6/1950 | Baer | 423/269 |
| 2,837,474 | 6/1958 | Cartledge | 252/387 |
| 2,863,780 | 12/1958 | Ball, Jr. | 423/269 |
| 2,981,643 | 4/1961 | Baybarz | 252/387 |
| 3,294,650 | 12/1966 | Manteufel | 423/531 |
| 3,415,754 | 12/1968 | Freuel | 252/387 |
| 3,713,786 | 1/1973 | Umstead | 203/12 |

FOREIGN PATENTS OR APPLICATIONS

| | | | |
|---|---|---|---|
| 66,665 | 4/1948 | Denmark | 423/531 |
| 299,774 | 8/1915 | Germany | 423/531 |
| 651,048 | 5/1933 | Germany | 423/531 |
| 1,143,492 | 2/1963 | Germany | 423/531 |
| 51,918 | 1/1933 | Norway | 423/531 |
| 910,313 | 11/1962 | United Kingdom | 252/387 |
| 483,821 | 4/1938 | United Kingdom | 423/531 |

Primary Examiner—Oscar R. Vertiz
Assistant Examiner—Gary P. Straub
Attorney, Agent, or Firm—Curtis, Morris & Safford

[57] ABSTRACT

Contaminated sulfuric acid which may contain water, organic compounds and inorganic salts is converted to almost pure concentrated sulfuric acid by passing the acid through a Pauling plant and distilling the concentrated contaminated acid.

Addition of nitric acid improves the decomposition of organic compounds and ammonium salts of the contaminated acid.

10 Claims, No Drawings

PROCESS FOR THE REGENERATION OF SULFURIC ACID

The present invention relates to a process for the regeneration of sulfuric acid.

It is known that dilute sulfuric acid containing small amounts of impurities can be concentrated and optionally purified according to the process described in German Pat. No. 299,774 (1915) by H. Pauling. In this process, the sulfuric acid containing at least 70 weight % of pure acid is passed through a dephlegmator, i.e., fractionating column, mounted on a vessel having a sufficient capacity and made from cast iron, heated by means of gas, which dephlegmator is provided with partitions or a ceramic packing. Hot vapors rise from the boiling contents of the vessel to meet the cold dilute acid flowing downward; the vapors ascending in the dephlegmator absorb more and more water vapor from the descending cold dilute acid and simultaneously dissipate large amounts of their heat capacity to the acid. The dilute acid, while passing through the dephlegmator, is thus concentrated to about 90 weight %, starting from about 70 weight %. Concentrated, about 96% sulfuric acid is discharged from the constantly boiling contents of the vessel in the same amount in which the dilute acid is fed in via the dephlegmator, and cooled. In the case where the acid to be concentrated contains small amounts of impurities, for example up to 2 weight % of aromatic compounds from the nitration of benzene, toluene or naphthalene derivatives, these impurities are generally degraded while the acid is passing through the Pauling plant with conversion to carbon dioxide and water. The Pauling apparatus and process is also described in Ullmann, Encyclopedia der technischen Chemie, 3rd Ed., Vol. 15, at pages 443–444, a translation of a portion of which states: The Pauling process is carried out under normal pressure and with indirect heating. The apparatus consists of a vessel made of cast iron having a capacity of 5 m$^3$ around which flew gas is circulated, and rectifying column standing on the cover of the vessel, which column is made of steel or cast iron with acid-proof masonry lining, has a height of 3 m and a diameter of 400 mm and is charged with Raschig rings. The 68 to 70% sulfuric acid to be concentrated flows through the rectifying tower into the vessel. The sulfuric acid contained in the vapors is thus condensed, and the acid is preconcentrated to 82 to 85%. The vapors escaping from the rectifying tower have a temperature of about 120° to 140° C when leaving; they contain only traces of acid and are collected in a little condenser made of lead and charged with Raschig rings. In the vessel, the acid has to be maintained at a minimum of 96% (boiling point 330° C) in order to prevent the cast iron from being damaged. A vessel having a heating area of about 10 m$^2$ concentrates about 14 tons of sulfuric acid per day from 68 to 96%.

In order to facilitate the degradation, some weight % of nitric acid may be added to the dilute crude acid, if nitric acid is not already contained in the crude acid (incorporated during the nitration step).

Besides the degradation of organic compounds to $CO_2$ and water, this process, however, does not provide a further purification of the crude acid. By modification of the process, for example according to Chem. Apparatur 23 (1936), pp. 41/42, the purification can be improved only to a limited extent. Impurities, for example nitrogen in the form of ammonium salts, and especially metal salts such as sodium sulfate, the alkaline earth metal sulfates and partially also the heavy metal sulfates, remain dissolved in the acid obtained which, in certain cases, has a dark color because of small amounts of carbon present.

In the case where the concentrated acid is reused, accumulations may occur which make a repeated use of the regenerated acid impossible for the intended purpose.

A process has now been found for the regeneration of contaminated water containing 65 to 95% sulfuric acid, which comprises passing the contaminated water containing sulfuric acid through a Pauling plant and then distilling the concentrated contaminated acid so obtained; the distillation being carried out in such a manner that the acid is added continuously to an amount of concentrated acid heated to a constant temperature, the escaping vapors are condensed in known manner and the distillation bottom product is discharged continuously or batchwise.

This process is especially suitable for the regeneration of 65 to 95% crude acid contaminated by aromatic mono- and/or polycarboxylic acids and/or inorganic light and/or heavy metal salts and/or nitrogen compounds in a usual, i.e., conventional Pauling plant made of any suitable material, for example metals such as cast iron or the like, and a distillation apparatus connected to it.

The distillation of the preconcentrated contaminated and possibly dark colored 95 to 98% sulfuric acid is carried out in such a manner that the acid is allowed to flow continuously into a small amount of already boiling contaminated acid and the escaping vapors are condensed to form a pure colorless acid of the same concentration. In order to remove nitrogen in the form of ammonium salts, compounds containing trivalent and/or pentavalent positive nitrogen, for example nitrosylsulfuric acid or $HNO_3$, may be added to the concentrated sulfuric acid to be distilled.

The bottom product obtained is discharged continuously or batchwise. In case of a low content of impurities (especially of alkali metals the sulfates of which can be precipitated in the form of crystals only with difficulty), a discharge of the bottom product is sometimes necessary only after a prolonged period.

The heavy metal sulfates precipitating during the distillation and/or the preliminary Pauling process may be uniformly separated, collected and eliminated by means of a settling vessel having a narrow inlet orifice which is connected to the still or the evaporators.

The light metal sulfates, however, remain dissolved and are discharged with the bottom product.

For the distillation apparatus, any suitable material, for example cast iron with up to 18% silicon may be used.

The process as described above may be improved by a treatment preceding the Pauling process of the contaminated sulfuric acid with 1 to 5 weight % of an inert absorbing or adsorbing agent such as kieselguhr, bleaching earth, active charcoal, and subsequent filtration. Furthermore, from 1 to 5 weight % of nitric acid (calculated on 100% acid) may be added to the dilute sulfuric acid being crude or treated with the cited adsorbing or absorbing agents, and subsequently, the contaminated sulfuric acid may be heated for a short time. These pretreatments generally resullt in a substantial improvement of the color and a decrease of the impurities, for example the organic components of the crude acid. When a sufficient amount of nitric acid is added, approximately according to the ratio of % $HNO_3$ = 6 + weight % of N (N determined according to Kjeldahl), already part of the ammonium salts present or formed by degradation of organic nitrogen compounds are removed in the following concentration step.

It is also possible to fed nitric acid into the still of the Pauling plant.

The nitric acid advantageously should not be used in excess, which causes formation of nitrogen compounds having an oxidizing effect and their accumulation in the final product. The suitable amount of nitric acid may be determined for example by a test series using progressively increased amounts.

Many organic nitrogen compounds, for example nitriles or acid amides, are degraded on heating with concentrated sulfuric acid to form ammonium sulfate. Ammonium ions accumulate in the bottom product and may therefore be discharged, but they may also be destroyed using for example nitrosylsulfuric acid or nitric acid. This embodiment of the process according to the present invention is therefore especially appropriate for the work-up of sulfuric acid containing ammonium ions or forming them on heating. The amount of impurities advantageously should not exceed about 4% of C and 8% of N. According to the process of the invention, nitrogen containing organic impurities can be removed from sulfuric acid.

Because of the relatively low vaporization enthalpy of sulfuric acid (122 kcal/kg), the process of the invention allows an energetically favorable regeneration of sulfuric acid. A decrease of the energy expenditure is furthermore obtained by the fact that the concentrated sulfuric acid discharged at boiling temperature from the Pauling plant can be immediately vaporized, so that a special heating of the acid to boiling temperature before distillation is not necessary, and the heat capacity of the acid leaving the Pauling plant can be completely utilized.

As compared to the Pauling process, the process of the invention allows an essentially increased degradation of carbon or organic compounds: an approximate decrease of the carbon content of the acid obtained according to Pauling by 60 to 90% can be calculated on. In order to obtain a high rate of decrease of the organic impurities of the sulfuric acid in the Pauling process, long residence times of the boiling concentrated sulfuric acid are necessary in certain cases, which requires vessels of correspondingly large dimensions (see P. Parrish, Transactions Inst. chem. Eng. 19 (1941), 21).

The process of the invention allows shorter residence times for the sulfuric acids in the Pauling step, because the two-step heat treatment of the contaminated acid ensures a better degradation of the organic impurities than in the Pauling process alone, even a short residence times. Shorter residence times of the hot concentrated sulfuric acid will also reduce corrosion of the usual Pauling plants employing vessels made from cast iron. The degradation of organic substances is furthermore increased by the presence of heavy metal salts, for example iron or copper salts, during the heat treatment of the crude sulfuric acid. This favorable effect of impurities of heavy metals in the sulfuric acid is utilized by the sequence of process steps according to the present invention, since the metal salts are active in both process steps.

The process especially allows working up dilute sulfuric acid contaminated by aromatic mono- and/or polycarboxylic acids, which kind of sulfuric acid, because of the chemical and thermal stability of these mixtures, can be regenerated only with difficulty according to known methods, especially in the case where also further impurities such as ions of light and/or heavy metals (for example Na, K, Mg, Cu, Fe) are contained in the sulfuric acid.

The process of the invention is especially suitable for the purification of sulfuric acid containing besides aromatic mono- and/or polycarboxylic acids also light and/or heavy metals, organic nitrogen compounds and ammonium ions and/or forming same when heated.

When a sulfuric acid containing these impurities is to be purified, it can be anticipated that, when the sulfuric acid enters the dephlegmator of the Pauling plant, an essential part of the volatile aromatic carboxylic acids is separated from the crude acid together with the aqueous distillate in a similar manner as in a steam distillation. Thus, a degradation to $CO_2$ is not required for these carboxylic acid amounts.

The most important advantage of the process of the invention resides however in the separation of dissolved inorganic salts from the contaminated sulfuric acid and the concentration of these salts in a small amount of concentrated sulfuric acid, thus ensuring their easy removal or work-up; all this not being provided by the original Pauling process. It is an especially important factor of the process of the invention that ammonium salts being present in at least stoichiometric amounts, by their reaction with positive tri- and/or pentavalent nitrogen, for example nitrosylsulfuric acid or nitric acid, prevent nitrogen compounds having an oxidizing action to be present in the final product in the form of nitrose gases, so that the regenerated acid remains free from oxidizing substances, which fact may be important for the reuse of the acid for certain applications. On the other hand, the ammonium salts present are degraded to nitrogen in the cited reaction and thus eliminated in a simple manner. Indications for the conversion of positive pentavalent to positive trivalent nitrogen with the use of nitric acid are given in Gmelin's Handbuch 9, sulfur (1969), p. 1639 sqq.

This reaction may also be utilized to liberate the bottom product from concentrated ammonium ions either before or after the discharge.

Another advantage of the process in accordance with the present invention resides in the especially small losses of gas in certain cases (about 5.5%, relative to the crude acid used, of $SO_2$, $CO_2$, optionally $N_2$, or nitrose). When the sequence of steps is reversed, so that the water containing crude acid is first distilled and subsequently concentrated according to Pauling, such as it is described by E. Becker in Chem. Apparatur 23 (1936) 41, there are increased gas losses in the corresponding cases (about 8.5%). This reversing of the process steps without a prolongation of the residence times results only in a colored sulfuric acid in many cases, while according to the process of the invention a practically colorless acid is obtained.

Generally, the gas losses for both steps of the process of the invention may be calculated approximately as follows:

for the 1st step: % of gas losses ~2.5 + % of C
total for both steps: % of gas losses ~6.5 + % of C % of C = carbon content of the crude acid in weight %.

The boiling concentrated sulfuric acid causes a considerable corrosion of the material of the plant (Pauling vessel and distillation apparatus), especially in the case where it is made from cast iron.

In order to prevent this corrosion, an advantageous embodiment of the present invention provides the addition of compounds of tetra- or pentavalent vanadium or of hexavalent chrome to the sulfuric acid to be worked up, which additions may easily be separated later in the course of the work-up operations. The corrosion-repellent properties of vanadium ions are already known (German Auslegeschrift No. 1,242,431), while the corrosion-repellent activity of Cr(VI) compounds in a system of cast iron/boiling concentrated sulfuric acid is a surprising fact.

The vanadium or chrome compounds may be added to the sulfuric acid before or during the regeneration process. The elements may for example be used in the form of easily obtainable salts of the corresponding acids, for example $NH_4VO_3$ or $Na_2Cr_2O_7 \cdot 2 H_2O$. Tetravalent and/or pentavalent vanadium or hexavalent chrome are active also in the presence of impurities of dilute sulfuric acid which have a reducing effect, such as organic components. In these cases, however, the amount of V or Cr compound must be adapted to the amount of impurities in the sulfuric acid, or an oxidizing agent, for example 0.1 to 5% of nitric acid, has to be added in order to better utilize the activity of the inhibitor. The amounts necessary in each special case may be determined by corresponding test series.

The use of chrome as inhibitor is facilitated by the fact that the excess amount of the hexavalent chrme compounds in the presence of organic components of the sulfuric acid is reduced during the process to Cr(III) salts without substantially decreasing the protective effect against corrosion. Thus, also in the presence of hydrogen chloride the separation of Cr in the second step is possible. Generally, the metal salts added are collected in the bottom product. It is an advantage of the process that the metal ions added can display their favorable activity though they are not contained in the purified sulfuric acid.

Precautions have to be used in the case where hydrogen chloride is contained in the sulfuric acid and hexavalent chrome is employed, because of the possible formation of highly volatile chromyl chloride (from HCl and compounds of hexavalent chrome in the presence of concentrated sulfuric acid). Chromyl chloride occurring in the second step of the process may result in a contamination of the final product. Therefore, the sulfuric acid has to be liberated from HCl before the regeneration process, for example by blowing with air; or the use of hexavalent chrome has to be limited to the first process step alone, where chromyl chloride possibly formed is hydrolyzed in the dephlegmator and fed into the sulfuric acid again in the form of chromic acid. Furthermore, organic impurities of the sulfuric acid reduce excess Cr(VI) compounds to trivalent compounds in the first step, which prevents a conversion to chromyl chloride.

The following examples illustrate the invention.

The nitrogen determination was carried out according to Kjeldahl. All analyses were carried out using sulfuric acid liberated from possible metal sulfate containing solid phases. Percentages of $H_2SO_4$ are by weight.

EXAMPLE 1

15.70 kg of a 83.8% sulfuric acid of dark color, to which 1% of nitric acid had been added, and contaminated by 0.75% of C, 0.52% of N (0.032% of this amount in the form of $NH_4^+$, the remaining part organically linked) and 0.15% of metals in the form of metal salts were concentrated in known manner in a Pauling apparatus made of glass. 0.7 kg of the 96.1% yellow sulfuric acid obtained (12.52 kg) was heated to 330° C in a distillation apparatus made of glass, and subsequently 3.3 kg of the sulfuric acid obtained were added dropwise at 330° C in such a manner that the acid volume in the still is nearly constant. The distillate was composed of a colorless acid having a content of 97.4% of $H_2SO_4$ and 0.032% of C and <10 ppm of N. A 86.3% sulfuric acid of greenish color containing 0.04% of C, 2.6% of N and 0.18% of metals in the form of metal sulfates was obtained as residue.

EXAMPLE 2

3.85 kg of a 97.7% sulfuric acid, contaminated by 0.10% of C, 0.01% of N, <0.01% of Cl and 0.001% of metals in the form of metal sulfates, were introduced into the still of a Pauling apparatus made of glass. Subsequently, 22.40 kg of a 82.6% sulfuric acid, contaminated by 1.0% of C, 0.4% of N, 0.06% of Cl and 0.21% of metals in the form of metal salts, and mixed with 4 weight % of $HNO_3$ were concentrated in the apparatus. At an average residence time of about 70 minutes and a gas loss of 2.7% (relative to 22.40 kg of sulfuric acid used), 4.26 kg of aqueous distillate and 21.38 kg of 96.3% brown sulfuric acid containing 0.34% of C, 0.3% of N, 0.01% of Cl and 0.05% of metals in the form of sulfates were obtained, 7.67 kg of which were distilled at a temperature of from 325° to 330° C (temperature of the still) as described in Example 1. A colorless 95.8% sulfuric acid (5.33 kg) containing 0.03% of C,<10 ppm of N and <0.01% of Cl was obtained. A distillation residue, 2.05 kg of yellow-green 93.9% sulfuric acid containing 0.18% of C, 1.1% of N, <0.01% of Cl and 0.05% of metals in the form of sulfates remained. The gas loss was 3.8%.

EXAMPLE 3

13.51 kg of a sulfuric acid contaminated by 1.0% of C (partially in the form of phthalic acid), 0.4% of N, 0.06% of Cl, 0.21% of metals in the form of metal salts,17.4% of $H_2O$ and mixed with 0.5% each of kieselguhr and active charcoal were filtered via a glass frit. 12.42 kg of a 86.1% sulfuric acid contaminated by 0.60% of C, 0.2% of N, 0.3% of Cl and 0.12% of metals in the form of metal salts were obtained.

After 3.95 kg of the acid cited in Example 2 had been introduced as batch for the still, 10.68 kg of the above-mentioned pretreated sulfuric acid were concentrated in known manner in a Pauling apparatus made of glass. 1.80 kg of aqueous distillate and 12.63 kg of a yellow-brown 97.2% sulfuric acid containing 0.23% of C, 0.14% of N, <0.01% of Cl and 0.05% of metals in the form of metal sulfates were obtained at an average residence time of about 60 minutes and a gas loss of 1.9%. 3.73 kg of the acid so obtained were distilled as described in Example 1 at 324°-327° C (temperature of the still). The yield was 2.86 kg of a colorless 97.3% sulfuric acid containing 0.033% of C, <10 ppm of N and <0.01% of Cl. As distillation residue, 0.83 kg of yellow 96.1% sulfuric acid containing 0.21% of C, 0.7% of N, <0.01% of Cl, and 0.08% of metals in the form of metal sulfates was obtained. The gas los was 1.1%.

EXAMPLE 4

After having charged the still of a Pauling apparatus made of glass with 3.58 kg of analytically pure 96% sulfuric acid, 6.74 kg of contaminated sulfuric acid (containing 1.0% of C, 0.4% of N, 0.06% of Cl, 0.21% of metals in the form of metal salts, comprising 0.025% of Fe, 0.18% of Cu and 0.0009% of Na, and 17.4% of $H_2O$) were rectified in known manner. 1.10 kg of aqueous distillate and 9.08 kg of a brown 96.5% sulfuric acid containing 0.35% of C, 0.2% of N, 0.01% of Cl, 0.05% of metals in the form of metal sulfates, comprising 0.025% of Fe, 0.045% of Cu and 0.0009% of Na were obtained. The gas loss was 2.1%. 4.58 kg of the acid obtained were subsequently distilled as described in Example 1 at 325°–330° C (temperature of the still). As distillate, 3.61 kg of nearly colorless 96.9% sulfuric acid containing 0.027% of C, <10 ppm of N and <0.01 % of Cl, and 0.83 kg of brown-yellow 92.7% bottom acid containing 0.27% of C, 1.3% of N, <0.01% of Cl and 0.08% of metals in the form of metal sulfates were obtained. The gas loss is 3.2%.

EXAMPLE 5

The still of a Pauling apparatus made of glass was charged with 3.41 kg of analytically pure 96% sulfuric acid. Subsequently, 14.01 kg of contaminated sulfuric acid (1.0% of C, 0.4% of N, 0.06% of Cl, 0.21% of metals in the form of metal salts, 17.4% of $H_2O$) were rectified in known manner, while simultaneously 0.50 kg of a mixture of concentrated sulfuric acid and fuming nitric acid (1 : 1) were introduced uniformly into the still. Besides 2.42 kg of aqueous distillate, 15.05 kg of brown 96.5% of sulfuric acid containing 0.35% of C, 0.2% of C, 0.2% of N, 0.01% of Cl and 0.06% of metals in the form of metal sulfates were obtained. The gas loss was 3.1%. The subsequent distillation in the manner described in Example 1, for 4.50 kg of the acid used, yielded 3.51 kg of a colorless 96.8% sulfuric acid containing 0.04% of C, <10 ppm of N and <0.01% of Cl. As distillation residue, 0.86 kg of a 94.1% yellow sulfuric acid containing 0.12% of C, 0.9% of N, <0.01% of Cl and 0.05% of metals in the form of metal sulfates was obtained. The gas loss was 2.9%.

EXAMPLE 6

A circulating evaporator having a capacity of 1 liter was charged with 1960 g of a solution containing 4 g of phthalic anhydride and 6.9 g of sodium nitrate in 1 kg of concentrated sulfuric acid. 4 g of $CuSO_4 \cdot 5H_2O$, 1.6 g of NaCl and 2 g of $NH_4VO_3$ were added. The mixture was heated, subsequently, at about 240° C, a cast iron sample was introduced and heating was continued until boiling. The corrosion mixture was maintained for 8.1 hours at boiling temperature of 304° to 309° C with a slight reflux. Simultaneously, 2073 g of the cited mixture of phthalic anhydride, sodium nitrate and concentrated sulfuric acid were added dropwise and correspondingly, 4 g of $CuSO_4 \cdot 5H_2O$, 1.6 g of NaCl and 2 g of $NH_4VO_3$ were uniformly introduced. The acid mixture was let off the apparatus by means of a U-shaped tube connected to the bottom of the circulating evaporator, which tube controlled the acid level in the circulating evaporator. After the end of the heating, the cast iron sample was removed at 240° C from the circulating evaporator, rinsed, vigorously rubbed with a towel, dried and weighed. The corrosion loss was 0.11 $mg/cm^2 \cdot$ hour.

EXAMPLE 7

As described in Example 6, the circulating evaporator was charged with 1972 g of the solution according to Example 6 of phthalic anhydride and sodium nitrate in sulfuric acid, and 4 g of $CuSO_4 \cdot 5H_2O$, 1.6 g of NaCl and 2 g of $Na_2Cr_2O_7 \cdot 2H_2O$ were added. After heating the introduction of the cast iron sample at about 240° C, the whole was maintained at boiling temperature of 308°–309° C for 7.7 hours. During this time, 2061 g of the sulfuric acid solution were added dropwise, and 4 g of $CuSo_4 \cdot 5H_2O$, 1.6 g of NaCl and 2 g of $Na_2Cr_2O_7 \cdot 2H_2O$ were uniformly introduced. After this time, the sample was removed at about 250° C and treated as described in Example 6. There was no corrosion loss.

As compared to Examples 6 and 7, the corrosion loss of cast iron without the addition of V or Cr compounds was 11.6 $mg/cm^2 \cdot$ hour.

The cast iron used was perlite grey cast iron having an A 4 graphite structure and containing 3.3% of C, 2.4% of Si, 0.63% of P, 0.15% of S, 0.52% of Mn, 0.043% of Ni; further components of the alloy as usual in gray cast iron, remainder: iron.

What is claimed is:

1. A two-step process for the continuous regeneration of contaminated aqueous 65 to 95% sulfuric acid to obtain essentially pure 95 to 98% sulfuric acid, which comprises adding to said contaminated sulfuric acid a hexavalent chromium compound as a corrosion inhibitor and in a first step continuously feeding said contaminated 65 to 95% sulfuric acid containing metal salt contaminants and a small amount of up to 4% by weight organic impurities, calculated as carbon, to a cast iron dephlegmator mounted on an external heated vessel containing concentrated boiling sulfuric acid at atmospheric pressure, removing overhead water vapor and volatile organic contaminants, continuously withdrawing as a bottoms product 95 to 98% concentrated contaminated acid and continuously feeding the withdrawn acid, in a second step, to a cast iron distillation unit in which boiling concentrated sulfuric acid is maintained, continuously removing and recovering overhead essentially pure 95 to 98% concentrated sulfuric acid and withdrawing and removing from the distillation step nonvolatile metal salt contaminants as a bottoms product.

2. The process of claim 1 which comprises addinng 0.1 to 5 weight % nitric acid to the feed to the first step.

3. The process of claim 1 which comprises adding 0.1 to 5 weight % of nitric acid to the feed to the second step.

4. The process of claim 1 which comprises adding to the contaminated sulfuric acid feed to the first or second step an inorganic compound of positive tri- and/or pentavalent nitrogen.

5. The process of claim 1 which comprises adding to the first or second step a sufficient amount of inorganic compounds of positive tri- and/or pentavalent nitrogen to decompose ammonium ions present.

6. The process of claim 1 wherein the contaminants are members selected from the group consisting of aromatic mono carboxylic acids, aromatic polycarboxylic acids, and ions of light and heavy metals.

7. The process of claim 1 wherein volatile organic contaminants are removed overhead with water vapor in the first step, and heavy metal salts are precipitated in the bottoms product of the first step and are removed from the bottoms product.

8. The process of claim 1 wherein heavy metal sulfates are precipitated in the bottoms product of the second step and are separated therefrom, and soluble light metal sulfates are removed with the concentrated contaminated sulfuric acid bottoms product.

9. The process of claim 1 wherein the corrosion inhibitor is $Na_2Cr_2O_7 \cdot 2H_2O$.

10. The process of claim 9 wherein during the second step the corrosion inhibitor is separated by distillation from essentially pure concentrated sulfuric acid distillate product and remains with the contaminated concentrated sulfuric acid bottoms product.

* * * * *